H. L. ISHAM.

VEHICLE SPRING.

No. 9,827. Reissued Aug. 2, 1881.

Witnesses.
Franck L. Durand
Geo. M. Finckel.

Inventor.
Harry L. Isham,
by his attorney
Wm. N. Finckel.

N. PETERS, Photo-Lithographer, Washington, D. C.

UNITED STATES PATENT OFFICE.

HARRY L. ISHAM, OF PLATTSBURG, NEW YORK.

VEHICLE-SPRING.

SPECIFICATION forming part of Reissued Letters Patent No. 9,827, dated August 2, 1881.

Original No. 191,150, dated May 22, 1877. Application for reissue filed June 16, 1881.

*To all whom it may concern:*

Be it known that I, HARRY L. ISHAM, of Plattsburg, in the county of Clinton and State of New York, have invented certain new and useful Improvements in Vehicle-Springs; and I do hereby declare that the following is a full, clear, and exact description thereof, which will enable others skilled in the art to which said invention appertains to make and use the same, reference being had to the accompanying drawings, and to the letters of reference marked thereon, which form a part of this specification, and in which drawings—

Figure 1:
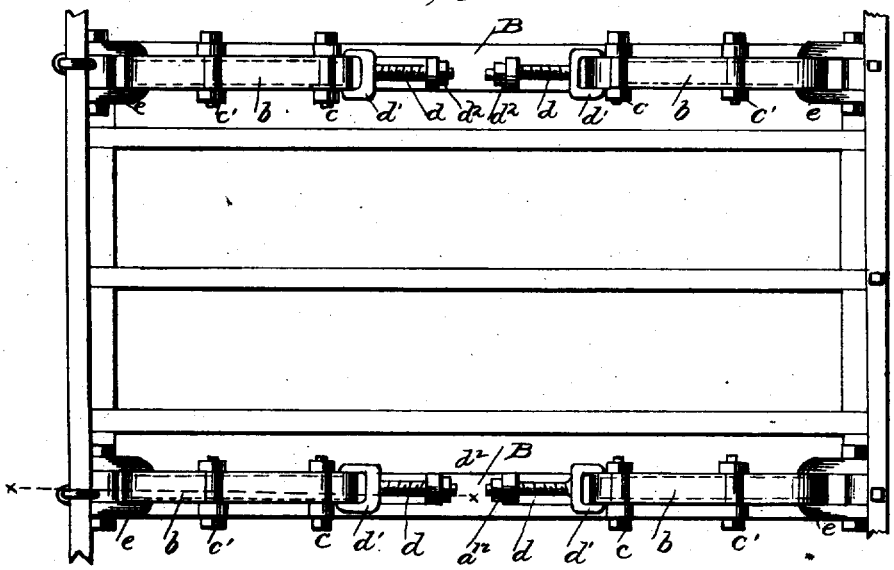
Figure 2:
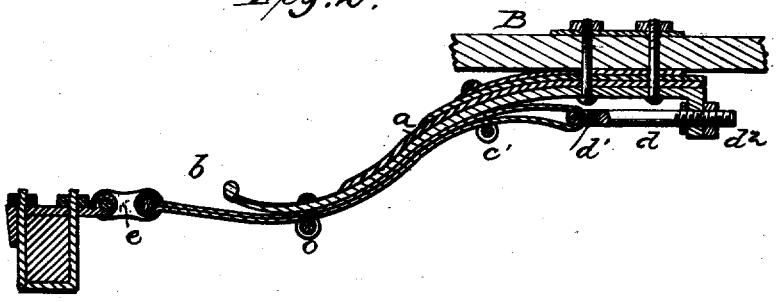

Figure 1 is an inverted view of a vehicle-body and running-gear with my improved spring applied thereto, and Fig. 2 is a section through the dotted line *x x* of Fig. 1.

Corresponding parts in the two figures are denoted by like letters.

The object of this invention is to provide a light, cheap, and durable spring, and one which will permit of the body being brought in proximity with the reach when in position, and by which slack, &c., from wear can be taken up to true the body; and it consists, first, of a lever-spring resting upon a thorough brace or strap and combined with the vehicle; and, secondly, of slack take-up mechanism for the thorough-brace; and, thirdly, of the spring, in combination with, and connected to, the thorough-brace by clips or loops, and provided with a slack take-up mechanism, substantially as hereinafter more fully set forth.

In the annexed drawings, *a* refers to a lever-spring, of which there are four to a vehicle. This spring may be made of one or more leaves, and is bolted at its inner or upper end to the part B to be supported, and rests upon the thorough-brace *b*, with which it may be connected by clips or loops *c c'*. The thorough-brace *b* is connected at one end, loosely or flexibly, by a shackle, *e*, to an adjacent support, as the bolster or axle; thence passed through the clips or loops *c c'*, and provided at its other end with a threaded bolt, *d*, attached thereto by a loop or eye, *d'*, and provided with an adjusting-nut, $d^2$, constituting the slack take-up mechanism for the thorough-brace. The flexible shackle *e* is provided in order that the lunge of the vehicle in going over rough roads or obstructions may be taken up by the thorough-brace and spring from the vehicle-body, thus insuring easy riding.

My invention possesses, among others, the following advantages: The weight of the springs is reduced over one-half, with a proportionate reduction in cost. The slack of each strap can be taken up, or its tension regulated separately, and where two or more reaches are used they can be placed farther under the vehicle to give more room in cramping. It is applicable to all classes of vehicles, from the light road to the heavy draft or express wagon.

Having thus described my invention, what I claim, and desire to secure by Letters Patent, is—

1. A spring, *a*, combined with and resting upon a strap or thorough-brace, *b*, substantially as and for the purpose set forth.

2. A spring, *a*, resting upon a strap or thorough-brace, *b*, combined with a threaded bolt, *d*, and nut $d^2$, as and for the purpose set forth.

3. A spring, *a*, in combination with and connected to a thorough-brace or strap, *b*, by loops or eyes *c c'*, threaded bolt *d*, and nut $d^2$, substantially as and for the purpose set forth.

4. A spring provided with and resting upon a thorough-brace flexibly jointed to or connected with the point of support, whereby the lunge of the vehicle is taken by the spring and thorough-brace from the body, substantially as described.

5. A spring rigidly connected with the vehicle at one end, combined with a loose joint at its other end, and mechanism to compensate for slack or wear, substantially as described.

6. The thorough braces or straps *b*, provided with slack take-up mechanism, combined with springs *a* overlying such straps, and supported by them, substantially as described.

H. L. ISHAM.

Witnesses:
A. GUIBARD,
A. M. JATT.